United States Patent
Kikuchi et al.

(10) Patent No.: US 6,885,616 B2
(45) Date of Patent: Apr. 26, 2005

(54) OPTICAL PICKUP APPARATUS AND INFORMATION RECORDING AND/OR REPRODUCING APPARATUS

(75) Inventors: Ikuya Kikuchi, Tsurugashima (JP); Takanori Maeda, Tsurugashima (JP); Mitsuru Sato, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 207 days.

(21) Appl. No.: 09/765,306

(22) Filed: Jan. 22, 2001

(65) Prior Publication Data

US 2001/0021146 A1 Sep. 13, 2001

(30) Foreign Application Priority Data

Feb. 1, 2000 (JP) ........................................ 2000-024126

(51) Int. Cl.[7] .............................................. G11B 7/00
(52) U.S. Cl. .............................. 369/44.23; 369/112.02; 369/118; 386/126
(58) Field of Search .......................... 369/44.23, 44.32, 369/112.01, 112.03, 112.02, 112.15, 112.18, 118, 44.41, 53.19, 44.37, 94, 53.25, 94.24, 112.22, 112.28; 386/126; 359/279, 719, 721, 238, 298; 349/128, 130

(56) References Cited

U.S. PATENT DOCUMENTS

| | | | | |
|---|---|---|---|---|
| 5,349,592 A | * | 9/1994 | Ando ........................... | 372/32 |
| 5,665,957 A | * | 9/1997 | Lee et al. .................. | 369/53.23 |
| 5,825,448 A | * | 10/1998 | Bos et al. .................... | 349/128 |
| 5,936,923 A | * | 8/1999 | Ootaki et al. ............. | 369/53.19 |
| 6,078,554 A | * | 6/2000 | Ootaki et al. ........... | 369/112.02 |
| 6,151,154 A | * | 11/2000 | Ogasawara et al. .......... | 359/279 |
| 6,167,019 A | * | 12/2000 | Tsuchiya et al. ........ | 369/112.02 |
| 6,201,780 B1 | * | 3/2001 | Katayama ............... | 369/112.19 |
| 6,321,028 B1 | * | 11/2001 | Kajiyama et al. ........... | 386/126 |
| 6,480,454 B1 | * | 11/2002 | Wada et al. ............ | 369/112.02 |
| 6,487,160 B1 | * | 11/2002 | Iida et al. ............... | 369/112.02 |
| 6,510,111 B1 | * | 1/2003 | Matsuura .................. | 369/44.32 |
| 6,574,182 B1 | * | 6/2003 | Yamada et al. ......... | 369/112.03 |

FOREIGN PATENT DOCUMENTS

JP         2000-182254        6/2000

* cited by examiner

*Primary Examiner*—William Korzuch
*Assistant Examiner*—Kim-Kwok Chu
(74) *Attorney, Agent, or Firm*—Morgan, Lewis & Bockius LLP

(57) ABSTRACT

A phase device for providing a phase difference between an inner radius portion and an outer radius portion of a light beam which is emitted from a light source is provided in an optical path between the light source of an optical pickup apparatus and an objective lens. The light beam to which the phase difference has been provided is converged by the objective lens and irradiated to an optical disc. An interference of an inner radius portion and an outer radius portion of the returning light beam caused when the light beam is diffracted by the optical disc with ±1 primary diffracted light caused by the diffraction is suppressed. Therefore, an intensity fluctuation of the returning light beam caused by the interference is suppressed. A spherical aberration error showing a thickness error of the optical disc and a focusing error having a high linearity can be detected with high precision on the basis of the returning light. A numerical aperture of the objective lens, consequently, can be increased, high density information recording and information reproduction can be performed, and further, an optical pickup apparatus and an information recording and/or reproducing apparatus each having compatibility are realized.

8 Claims, 14 Drawing Sheets

FIG. 4

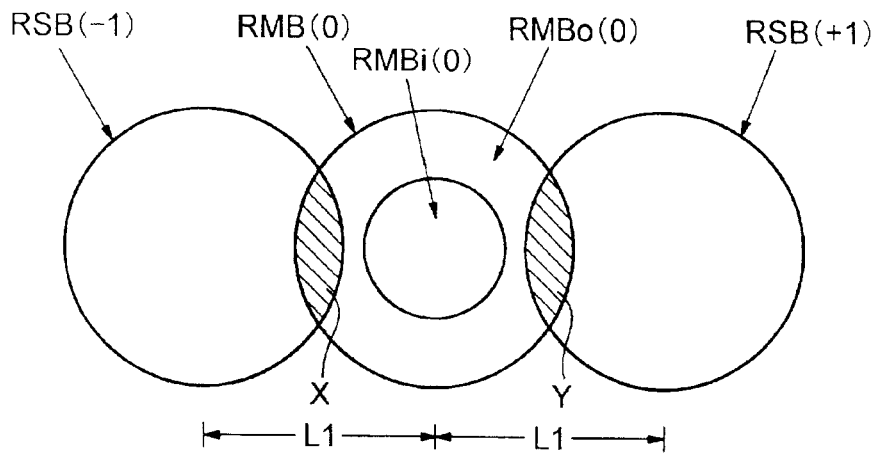

(
POSITIONAL RELATION BETWEEN THE 0-TH ORDER LIGHT AND THE
±1 PRIMARY DIFFRACTED LIGHT WHEN THE NUMERICAL APERTURE
NA IS SMALL IN THE IN-FOCUS STATE OR WHEN THE TRACK PITCH
TP IS SMALL IN THE IN-FOCUS STATE.
RMB(0):0-TH ORDER LIGHT, RMBi(0):INNER RADIUS LIGHT,
RMBo(0):OUTER RADIUS LIGHT, RSB(-1):-1 PRIMARY DIFFRACTED LIGHT,
RSB(+1):+1 PRIMARY DIFFRACTED LIGHT
)

FIG. 5

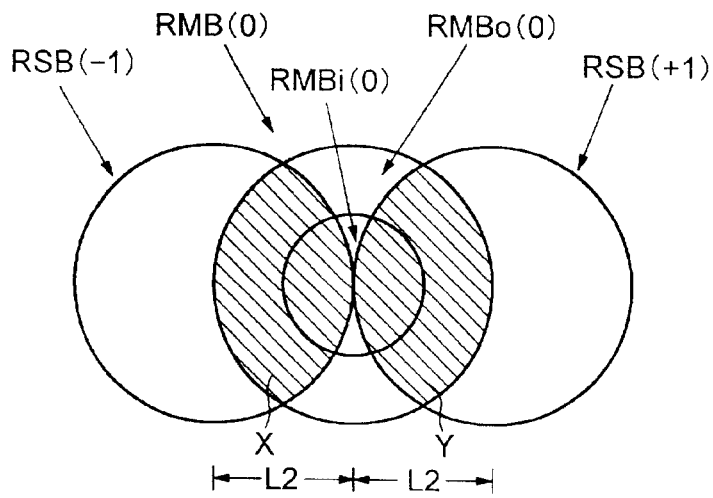

(
POSITIONAL RELATION BETWEEN THE 0-TH ORDER LIGHT AND THE
±1 PRIMARY DIFFRACTED LIGHT IN A CASE WHERE THE NUMERICAL
APERTURE NA IS LARGE IN THE IN-FOCUS STATE OR IN A CASE
WHERE THE TRACK PITCH TP IS LARGE IN THE IN-FOCUS STATE.
)

POSITIONAL RELATION BETWEEN THE 0-TH ORDER LIGHT AND THE ±1 PRIMARY DIFFRACTED LIGHT WHEN THE NUMERICAL APERTURE NA IS LARGE AND IN THE DEFOCUSING STATE, OR WHEN THE TRACK PITCH TP IS LARGE AND IN THE DEFOCUSING STATE.

OPTICAL PICKUP APPARATUS AND INFORMATION RECORDING AND/OR REPRODUCING APPARATUS

BACKGROUND OF THE INVENTION

1. Field of the Invention

The present invention relates to an optical pickup apparatus and an information recording and/or reproducing apparatus for performing information recording to an information recording medium and/or performing information reproduction from the recording medium.

2. Description of the Related Art

An optical disc such as a CD (Compact Disc) or a DVD (Digital Video Disc or Digital Versatile Disc) is well known as an information recording medium to/from which information recording or information reproduction is optically performed. Development has progressed for various optical discs including a read-only optical disc, a write-once optical disc on which additional recording can be performed and a rewritable optical disc in which erasing and re-recording of information data can be performed. In particular, development is being pursued concerning a high-density optical disc which has a large recording capacity.

Research and development of an optical pickup apparatus and an information recording and/or reproducing apparatus have been being progressed for performing the information recording and/or information reproduction to/from the above-mentioned optical discs. There is considered a method of coping with the high-density discs by increasing a numerical aperture (NA) of an objective lens provided in the pickup apparatus.

The optical disc has a structure such that a laser beam is irradiated through a light transmitting layer covering a recording surface. The thickness of the light transmitting layer, however, is not always uniform over the entire surface of the optical disc. If the numerical aperture NA of the objective lens is increased and, thus, a range of an incident angle of the laser beam is increased, the laser beam is greatly influenced by a spherical aberration due to a thickness variation or error of the light transmitting layer.

The thicknesses of light transmitting layers between, for example, a CD and a DVD are different. Therefore, the thickness difference exerts an influence similar to that by the thickness variation. Particularly, it is difficult to realize an optical pickup apparatus having compatibility when the numerical aperture NA of the objective lens is increased.

In order to solve the problem, there has been proposed an optical pickup apparatus such that a thickness variation of a light transmitting layer is optically detected from a returning light returned from a recording surface of an optical disc by a reflection or the like and a spherical aberration is compensated on the basis of a detection result (see, Japanese Patent Application Kokai No.2000-182254).

The pickup apparatus has a configuration shown in FIG. 1. For example, a laser beam is emitted from a light source 1 upon information reproduction. The laser beam is transmitted through a collimator lens 2, a beam splitter 3, a ¼ wavelength plate 4, and an objective lens 5, and is converted into a beam of a small irradiation diameter, and irradiated to a recording surface through the light transmitting layer of an optical disc 8.

The laser beam is reflected by the recording surface and the resultant returning light is transmitted through the objective lens 5, the ¼ wavelength plate 4, the beam splitter 3, and a condenser lens 6 and is detected by a photodetector 7. The laser beam is reflected and diffracted by the recording surface when the laser beam is irradiated on the recording surface of the optical disc 8 through the objective lens 5 as shown in FIG. 2, a 0-th order light RMB(0) and a diffracted light obtained by reflection and diffraction are transmitted as returning light through the objective lens 5, and the photodetector 7 detects the light intensity of the returning light.

The photodetector 7 separately detects a light intensity of each of a light RMBi passing through an inner radius portion of the objective lens 5 (hereinafter, referred to as an inner radius light) and a light RMBo passing through an outer radius portion of the objective lens 5 (hereinafter, referred to as an outer radius light) which are obtained by separating the returning light (the 0-th order light RMB(0) and the diffracted light) and generates a detection signal FE1 indicating the light intensity of the inner radius light RMBi and a detection signal FE2 indicating the light intensity of the outer radius light RMBo.

As shown in FIG. 3, the detection signal FE1 which is generated from the photodetector 7 is set to be a focusing error FE. The objective lens 5 is adjusted so as to be in an in-focus state within a capture range so that the focusing error FE is equal to 0. Further, the detection signal FE2 which is obtained when the objective lens 5 is in the in-focus state and the detection signal FE1 are compared by a differential amplifier, thereby detecting a thickness error SPHE of the light transmitting layer. The thickness error SPHE is set to a spherical aberration error. A position of the collimator lens 2 in the direction of an optical axis OA is finely adjusted so as to set the spherical aberration error SPHE to be 0, thereby compensating an influence of the spherical aberration which is caused by the thickness error of the light transmitting layer.

The conventional optical pickup apparatus, however, has the following problem.

As shown in FIG. 2, where the laser beam is irradiated to the recording surface of the optical disc 8, a diffraction pattern in a state where the 0-th order light RMB(0), a +1 primary diffracted light RSB(+1), and a −1 primary diffracted light RSB(−1) are partially overlapped is generated as shown in, for example, FIGS. 4, 5, and 6 in accordance with optical parameters such as numerical aperture (NA) of the objective lens 5 and a track pitch TP of the optical disc 8. A phenomenon such that each light intensity of overlapped portions X and Y in the 0-th order light RMB(0) is decreased or increased in dependence on an interference of the light occurs.

According to the conventional optical pickup apparatus, the focusing error FE is detected from the inner radius light RMBI, a focusing servo is performed, the focusing error FE is set to a reference, and the spherical aberration error SPHE is detected from the outer radius light RMBo, thereby compensating the influence of the spherical aberration. It is, therefore, necessary that the focusing error FE and spherical aberration error SPHE should be detected with high linearity and high precision.

When each light intensity of the overlapped portions X and Y in the 0-th order light RMB(0) is largely decreased or increased in dependence on the interference of the diffracted light, the focusing error FE and spherical aberration error SPHE cannot be detected with high linearity from the light RMBi(0) in the inner radius portion and the light RMBo(0) in the outer radius portion of the 0-th order light RMB(0). It causes a problem such that it is difficult to perform the focusing servo and spherical aberration compensation with high precision.

For example, as shown in FIG. 4, when the numerical aperture NA of the objective lens 5 is relatively small and the objective lens 5 is in the in-focus state or in the case where the laser beam is irradiated to an optical disc (for example, CD or the like) in which the track pitch TP is relatively narrower than the wavelength λ of the laser beam and the objective lens 5 is in the in-focus state, each interval L1 between each of the +1 primary diffracted light RSB(+1) and −1 primary diffracted light RSB(−1) and the 0-th order light RMB(0) increases, so that the areas of the overlapped portions X and Y in the 0-th order light RMB(0) relatively decrease.

Further, in a case shown in FIG. 4, if the objective lens 5 is in a defocusing state when information recording or information reproduction is actually performed, the amplitudes on the plus side and the minus side are almost equal and the focusing error FE of high linearity in an S-character curved shape is detected in accordance with a defocusing amount as shown in FIG. 7.

In case of FIG. 4, therefore, the linearity of each of the focusing error FE and the spherical aberration error SPHE is not deteriorated since the areas of the overlapped portions X and Y in the 0-th order light RMB(0) are relatively small, so that a problem such that the precision in each of the focusing servo and the spherical aberration compensation deteriorates does not occur.

When the numerical aperture NA of the objective lens 5 is relatively large and the objective lens 5 is in the in-focus state or in a case where the laser beam is irradiated to an optical disc (for example, land/groove recording disc or the like) in which the track pitch TP is relatively wider than the wavelength λ of the laser beam and the objective lens 5 is in the in-focus state, however, each interval L2 between each of the +1 primary diffracted light RSB(+1) and −1 primary diffracted light RSB(−1) and the 0-th order light RMB(0) decreases, so that the areas of the overlapped portions X and Y in the 0-th order light RMB(0) relatively increase. The light intensity of each of the overlapped portions X and Y in the 0-th order light RMB(0) is, therefore, greatly decreased or increased by the light interference as compared with the diffraction pattern shown in FIG. 4. Thus, a problem such that the detection precision of the focusing error FE and the spherical aberration error SPHE is deteriorated occurs.

Further, as shown in FIG. 6, when the numerical aperture NA of the objective lens 5 is relatively large or in a case where the laser beam is irradiated to an optical disc in which the track pitch TP is relatively wider than the wavelength λ of the laser beam and the objective lens 5 enters the defocusing state when information recording or information reproduction is actually performed, the light intensity of each of the overlapped portions X and Y in the 0-th order light RMB(0) is largely decreased or increased by the light interference. For example, therefore, as shown in FIG. 8, the focusing error FE in what is called a distorted S-character curved shape in which amplitudes on the plus side and minus side are different is detected.

As shown in FIGS. 5 and 6, therefore, the focusing error FE having a high linearity cannot be detected and a capture range is narrow and asymmetrical as shown in FIG. 8 when the numerical aperture NA of the objective lens 5 is relatively large or in the case where the track pitch TP of the optical disc is relatively wide. There is, consequently, a problem such that it is difficult to perform the focusing servo of high precision and thus to execute the spherical aberration compensation of high precision.

Particularly, it is extremely difficult to detect the focusing error FE having a high linearity when a light intensity of each of overlapped portions XI' and YI' of the inner radius light RMBi and the ±1 primary diffracted light RSB(+1) and RSB(−1) shown in FIG. 6 largely decreases, so that the focusing servo does not function and it is difficult to perform the spherical aberration compensation.

As mentioned above, the areas of the overlapped portions X and Y of the +1 primary diffracted light RSB(+1) and −1 primary diffracted light RSB(−1) to the 0-th order light RMB(0) increase when the numerical aperture NA of the objective lens 5 is increased so as to cope with the high density optical disc. Therefore, the focusing error FE and the spherical aberration error SPHE of high precision cannot be detected and thus a problem occurs that it is difficult to cope with the high-density optical disc.

Since the overlapped portions X and Y of the 0-th order light RMB(0) and the +1 primary diffracted light RSB(+1) and −1 primary diffracted light RSB(−1) occur by the diffraction irrespective of the value of the numerical aperture NA of the objective lens 5 or the value of the track pitch TP of the optical disc 8, it is an important object to suppress the decrease or increase of the light intensity in the overlapped portions X and Y in order to realize the optical pickup apparatus having compatibility and capability for the high-density discs.

OBJECTS AND SUMMARY OF THE INVENTION

The present invention is made to solve the abovementioned problems and it is an object of the invention to provide an optical pickup apparatus and an information recording and/or reproducing apparatus, in which a focusing error and a spherical aberration error of high linearity can be detected with high precision and a focusing servo and a spherical aberration compensation can be performed with a high degree of precision.

It is another object of the present invention to provide an optical pickup apparatus and an information recording and/or reproducing apparatus, in which a numerical aperture of an objective lens can be set to a large value.

Still another object of the present invention is to provide an optical pickup apparatus and an information recording and/or reproducing apparatus having compatibility such that even if a numerical aperture of an objective lens is increased, an information recording medium having a different recording density can be used.

To achieve the above-mentioned objects, according to one aspect of the present invention, there is provided an optical pickup apparatus, which comprises a light source for emitting a light beam; a phase device for providing the light beam with a phase difference between an inner radius portion of the light beam and an outer radius portion of the light beam, an objective lens for converging the light beam to which the phase difference has been provided and irradiating the converged light beam on an information recording medium; and detecting means for respectively detecting an intensity of an inner radius portion of the returning light beam and an intensity of the outer radius portion of the returning light beam from the information recording medium, thereby detecting error information of the information recording medium.

According to another aspect of the present invention, the phase difference of the phase device is set to a value in a range from $5\lambda/12$ to $7\lambda/12$.

According to another aspect of the present invention, the phase device is a variable phase device in which the phase difference is varied.

According to another aspect of the present invention, the phase device is a liquid crystal device in which optical phases of the inner radius portion and the outer radius portion of the light beam emitted from the light source are varied in accordance with an applied voltage.

According to another aspect of the present invention, the optical pickup apparatus further comprises an optical device which is provided at an arbitrary position in an optical path between the light source and the objective lens, the optical device separating the light emitted from the light source and the returning light from the information recording medium and supplying the returning light to the detecting means.

According to the optical pickup apparatus of the present invention, a phase difference is given to an inner radius portion and an outer radius portion of the light emitted from the light source and the light to which the phase difference has been given is converged by the objective lens and irradiated as a laser beam on the information recording medium. When the laser beam to which the phase difference has been given is irradiated on the information recording medium, the laser beam is diffracted by the information recording medium, a diffraction pattern in a state where the 0-th order light and the ±1 primary diffracted light are partially overlapped is generated, and the 0-th order light becomes the returning light. Further, the polarizing directions of the light in the inner radius portion and outer radius portion of the returning light are different in accordance with the phase difference. Moreover, the polarizing direction of the light in the inner radius portion of the returning light and that of the light in the outer radius portion of the ±1 primary diffracted light are also different in accordance with the phase difference.

Even in the case where the objective lens of the large numerical aperture is provided or the laser beam is irradiated on the high density information recording medium and the areas of the overlapped portions of the 0-th order light and the ±1 primary diffracted light are large, the light interference in the overlapped portions of the 0-th order light and the ±1 primary diffracted light is greatly suppressed. The intensity change, therefore, such that the intensity of the returning light is decreased or increased by the interference or the like is suppressed. The detecting means detects the intensity of each light in the inner and outer radius portions of the returning light whose intensity change has been suppressed, so that the error information such as focusing error having a high linearity, spherical aberration error showing the thickness error of the information recording medium, or the like is detected with high precision. By performing the focusing servo and the spherical aberration compensation on the basis of the detected error information, high density information recording to the information recording medium and high density information reproduction from the information recording medium can be performed. In other words, the optical pickup apparatus and the information recording and/or reproducing apparatus which are adapted to the high-density discs can be realized with using the objective lens of a large numerical aperture. The focusing servo and the spherical aberration compensation can be performed with high precision for every different kind of information recording medium even if the objective lens of a large numerical aperture is used. Therefore, the optical pickup apparatus and the information recording and/or reproducing apparatus having the compatibility can be realized.

According to another aspect of the present invention, the optical pickup apparatus further comprises driving means for positioning the objective lens to a focal point on the basis of the error information detected by the detecting means.

According to the optical pickup apparatus with the configuration, the focusing servo is performed so as to position the objective lens to the focal point on the basis of the error information detected by the detecting means. The optical pickup apparatus and the information recording and/or reproducing apparatus which is adapted to the high-density discs and has the compatibility can be realized.

According to another aspect of the present invention, the optical pickup apparatus further comprises a spherical aberration compensation device which is provided at an arbitrary position in an optical path between the light source and the objective lens and compensates a spherical aberration of the light emitted from the light source on the basis of the error information detected by the detecting means so as to suppress an influence of the spherical aberration on the light beam that is caused by a thickness error of the information recording medium.

According to the optical pickup apparatus with the configuration, the spherical aberration compensating device compensates the spherical aberration of the light emitted from the light source on the basis of the error information detected by the detecting means. The laser beam emitted from the light source, thus, becomes the light which is not influenced due to the spherical aberration based on the thickness error of the information recording medium and is irradiated to the information recording medium. The pickup apparatus and the information recording and/or reproducing apparatus which can perform high density information recording to the information recording medium and high density information reproduction from the information recording medium and the pickup apparatus and the information recording and/or reproducing apparatus having the compatibility can be realized.

According to another aspect of the present invention, there is provided an information recording and/or reproducing apparatus having the optical pickup apparatus, wherein information recording or information reproduction is performed by irradiating the light beam on the information recording medium.

According to the information recording and/or reproducing apparatus with the configuration, by providing the pickup apparatus having the objective lens of a large numerical aperture, the information recording and/or reproducing apparatus having the compatibility which can perform high density information recording and high density reproduction to/from the information recording medium can be realized.

BRIEF DESCRIPTION OF THE DRAWINGS

FIG. 4 is a diagram illustrating a diffraction pattern for explaining a problem in the conventional optical pickup apparatus;

FIG. 5 is a diagram illustrating a diffraction pattern for explaining the problem in the conventional optical pickup apparatus;

DETAILED DESCRIPTION OF THE PREFERRED EMBODIMENT

Figure 9:
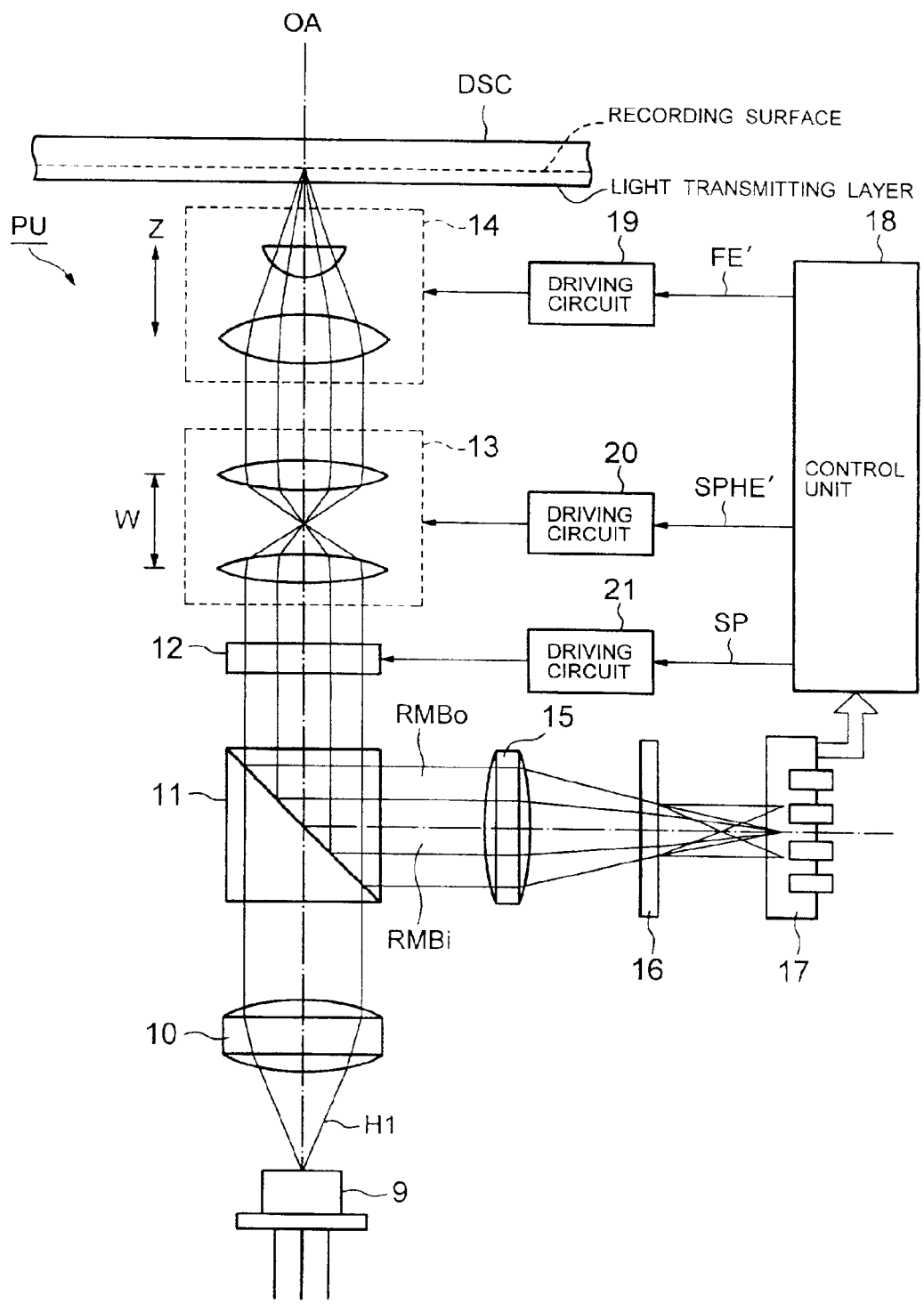
FIG. 9 is a diagram illustrating a configuration of an optical pickup apparatus and an information recording and/or reproducing apparatus according to an embodiment of the present invention.

An embodiment of the present invention will be described hereinbelow with reference to the drawings. FIG. 9 is a diagram showing a configuration of an optical pickup apparatus provided in an information recording and/or reproducing apparatus according to the embodiment.

The optical pickup apparatus PU comprises a light source 9 for emitting a laser beam H1 of a linear polarization having a predetermined wavelength $\lambda$, a collimator lens 10, a polarized beam splitter 11, a phase device 12, a spherical aberration compensation lens 13, an objective lens 14, a condenser lens 15, a hologram device 16, and a photodetector 17. The component elements 9 to 17 are arranged along the optical axis OA.

A control unit 18 including a microprocessor (MPU) and a digital signal processor (DSP), and driving circuits 19, 20 and 21 are provided in the information recording and/or reproducing apparatus.

The polarized beam splitter 11 transmits the linearly polarized laser beam from the collimator lens 10 to the phase device 12, while reflects a light beam (i.e., a light beam whose polarizing direction differs from that of the laser beam by 90°) entering from the phase device 12 to the condenser lens 15. More particularly, the polarized beam splitter 11 is constructed with optical elements for separating the laser beam and the returning light, and supplying the returning light to the condenser lens.

The phase device 12 is formed by an electro-optic device whose electro-optic effect changes due to an electric field applied thereto. More specifically, the phase device 12 is formed by a liquid crystal device in which phase characteristics against the polarization of the light changes in accordance with a voltage of a control signal SP which is supplied through the driving circuit 21.

Figure 10:
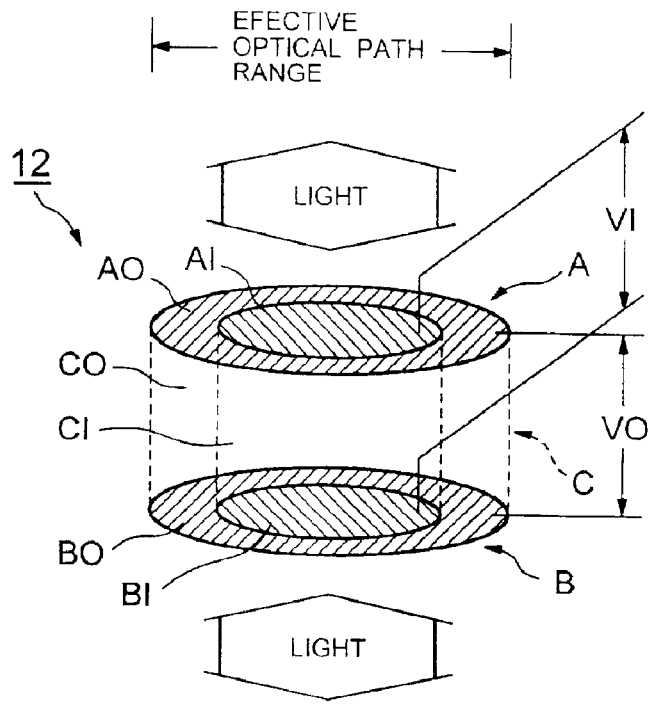
FIG. 10 is a diagram schematically showing a configuration of a phase device.

As schematically shown in FIG. 10, the phase device 12 is constructed by having electrode portions A and B which face each other and are formed in a circular shape in accordance with an effective optical path range of the spherical aberration compensation lens 13 and objective lens 14, and a liquid crystal C filled in a gap between the electrode portions A and B. The electrode portion A has a structure such that concentrical transparent electrode (ITO: Indium Tin Oxide) layers AI and AO which are mutually electrically insulated are formed on a transparent insulating substrate (not shown). The electrode portion B has a structure such that concentrical transparent electrode (ITO) layers BI and BO which are mutually electrically insulated are formed on a transparent insulating substrate (not shown).

When a control voltage VI is applied by the control signal SP across the circular transparent electrode layers AI and BI having a relationship in which they are opposed each other, an orientation state of a liquid crystal CI (or an inner radius portion of the liquid crystal C) sandwiched between the transparent electrode layers AI and BI changes in accordance with the electric field generated by the control voltage VI. A phase $\delta i$ according to the change of the orientation state is provided or given to the light passing through the liquid crystal CI and the resultant light is emitted. When a control voltage VO is applied by the control signal SP across the ring-shaped transparent electrode layers AO and BO, which are in an opposed positional relationship, an orientation state of a liquid crystal CO (or an outer radius portion of the liquid crystal C) sandwiched between the transparent electrode layers AO and BO changes in accordance with the electric field generated by the control voltage VO. A phase $\delta o$ according to the change of the orientation state is given to the light passing through the liquid crystal CO and the resultant light is emitted.

As mentioned above, a phase difference $\Delta(=|\delta i - \delta o|)$ between the phase $\delta i$ of the light passing through the liquid crystal CI and the phase $\delta o$ of the light passing through the liquid crystal CO can be independently adjusted by applying the control voltages VI and VO to the phase device 12.

Figure 11:
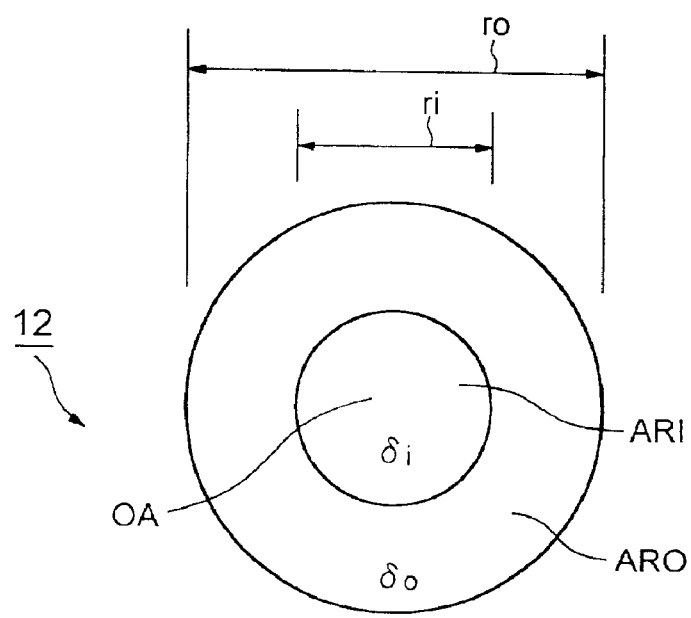
FIG. 11 is a plan view showing a shape of the phase device when the device is seen from the optical axis side.

The phase device 12 is segmented to concentrical phase areas ARI and ARO in which the optical axis OA is set to the center when the phase device 12 is seen from the optical axis OA side, as shown in a plan view of FIG. 11. The circular first phase area ARI corresponding to the inner radius portion is realized by a liquid crystal device configured by the transparent electrode layers AI, BI and the liquid crystal CI provided between the electrode layers AI, BI. The ring-shaped second phase area ARO corresponding to the outer radius portion is realized by a liquid crystal device configured by the transparent electrode layers AO, BO and the liquid crystal CO provided between the electrode layers AO, BO.

The phase device 12 of the embodiment provides or gives a phase change of $\delta i = \lambda/4 + n_1 \times \lambda/2$ to the polarization of the light passing through the first phase area ARI and gives a phase change of $\delta o = \lambda/4 + (n_2+1) \times \lambda/2$ to the polarization of the light passing through the second phase area ARO, thereby controlling so that the phase difference A in the polarizing direction between the light passing through the first phase area ARI and the light passing through the second phase area ARO is equal to $(2m+1) \times \lambda/2$. The coefficients $n_1$, $n_2$, and m are arbitrary integers.

Although the details will be mentioned in the description of the operation hereinlater, an inner radius light RMBi(0) of the 0-th order light RMB(0), which is caused when the laser beam that is converged by the objective lens 14 is diffracted by the recording surface of an optical disc DSC, is transmitted through the first phase area ARI and an outer radius light RMBo(0) of the 0-th order light RMB(0) is transmitted through the second phase area ARO. A diameter ri of the first phase area ARI is preset to a value adapted to detect a focusing error, which will be explained hereinlater, from the inner radius light RMBi(0). A diameter ro of the second phase area ARO is preset to a value adapted to detect a thickness error of a light transmitting layer of the optical disc DSC from the outer radius light RMBo(0).

Figure 12:
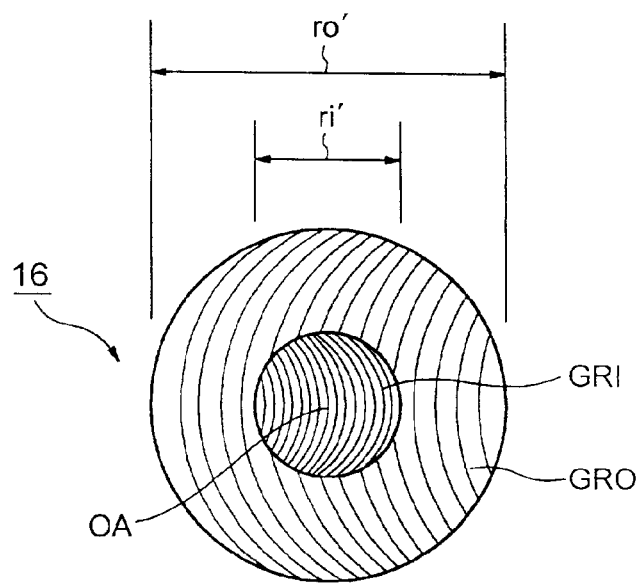
FIG. 12 is a plan view showing a shape of a hologram device when the device is seen from the optical axis side.

The hologram device 16 is formed in a circular shape so as to transmit the light from the condenser lens 15 as shown in a plan view of FIG. 12 and constructed by a first diffraction area GRI formed so as to have a diameter ri' in which the optical axis OA is set to a center, and a ring-shaped second diffraction area GRO formed so as to have an outside diameter ro'. The first diffraction area GRI and second diffraction area GRO are formed with fringe-shaped hologram patterns in which diffraction angles and focal distances for the light are different, respectively.

Figure 13:
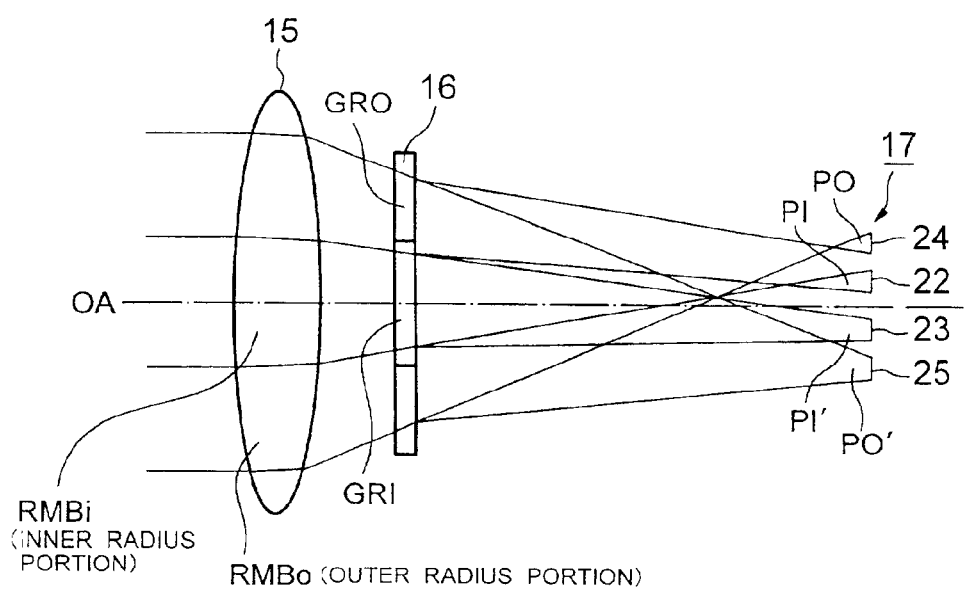
FIG. 13 is a diagram illustrating an optical path of a light beam which is incident on a detecting area of a photodetector from the hologram device.

As shown in FIG. 13, consequently, the inner radius light RMBi(0) transmitted through the first phase area ARI of the phase device 12 and the inner radius portion of the condenser lens 15 is diffracted in the first diffraction area GRI. Light spots PI and PI' which are caused by the diffraction are received by detecting areas 22 and 23 formed in the photodetector 17. The outer radius light RMBo(0) transmitted through the second phase area ARO of the phase device 12 and the outer radius portion of the condenser lens 15 is diffracted in the second diffraction area GRO. Light spots PO and PO' which are caused by the diffraction are received by detecting areas 24 and 25 formed in the photodetector 17.

Figure 14:
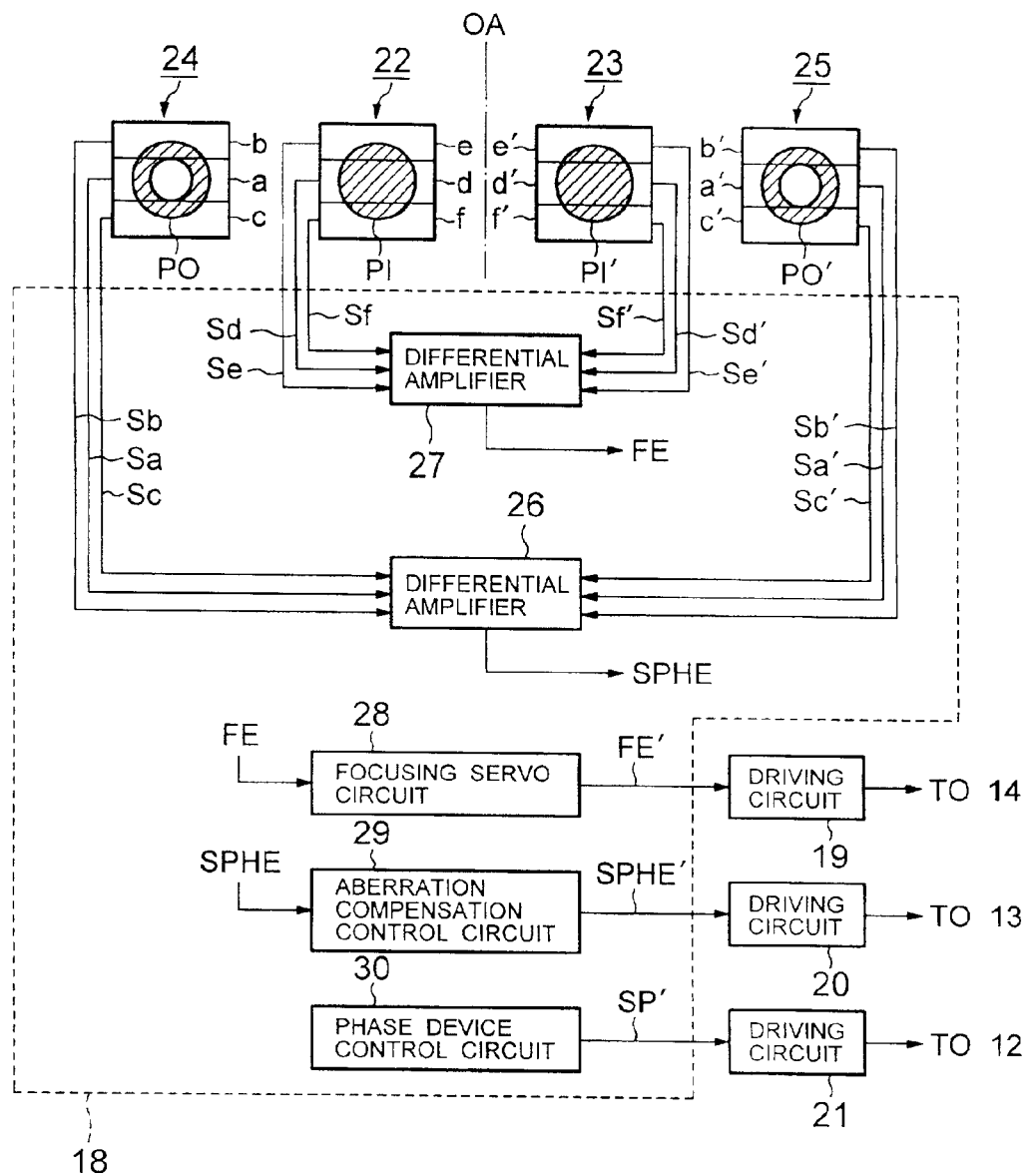
FIG. 14 is a block diagram showing a shape of the detecting area of the photodetector and a configuration of a control unit.

As shown in a block diagram of FIG. 14, each of the detecting areas 22 to 25 of the photodetector 17 has three divided detecting portions. More particularly, the detecting area 22 receives the light spot PI by detecting portions d, e, and f, the detecting area 23 receives the light spot PI' by detecting portions d', e', and f', the detecting area 24 receives the light spot PO by detecting portions a, b, and c, and the detecting area 25 receives the light spot PO' by detecting portions a', b', and c', respectively.

Further, the detecting areas 22 to 25 of the photodetector 17 have been positioned in advance so that the light spots PI, PI', PO, and PO' having the same outer diameter are formed on those areas in the case where there is no thickness error in the light transmitting layer of the optical disc DSC and the laser beam is irradiated in an in-focus state on the recording surface of the optical disc DSC.

The control unit 18 comprises differential amplifiers 26 and 27, a focusing servo circuit 28, an aberration compensation control circuit 29, and a phase device control circuit 30 as shown in FIG. 14.

The phase device control circuit 30 adjusts the phase characteristics of the phase device 12 by supplying the control signal SP to the phase device 12 through the driving circuit 21.

The differential amplifier 26 receives photoelectric conversion signals Sa, Sb, Sc, Sa', Sb', and Sc' of the light spots PO and PO' which are generated from the detecting portions a to c and a' to c' of the detecting areas 24 and 25 of the photodetector 17 and executes an arithmetic operation of the following equation (1), thereby generating a signal SPHE indicating the thickness error of the light transmitting layer of the optical disc DSC (hereinafter, referred to as a spherical aberration error signal).

$$SPHE = \{Sa-(Sb+Sc)\}-\{Sa'-(Sb'+Sc')\} \quad (1)$$

The differential amplifier 27 executes an arithmetic operation of the following equation (2) on the basis of photoelectric conversion signals Sd, Se, Sf, Sd', Se', and Sf' which are generated in the detecting areas 22 and 23 of the photodetector 17, thereby generating the focusing error signal FE indicating the defocusing amount of the objective lens 14.

$$FE = \{Sd-(Se+Sf)\}-\{Sd'-(Se'+Sf')\} \quad (2)$$

The detecting areas 22 to 25 of the photodetector 17 have been positioned in advance so that the light spots PI, PI', PO, and PO' are formed on those areas in the case where there is no thickness error in the optical disc DSC and the laser beam is irradiated in the in-focus state onto the recording surface of the optical disc DSC. When a thickness error, therefore, exists in the light transmitting layer of the optical disc DSC, the spherical aberration error signal SPHE indicating the thickness error is generated by the arithmetic operation of the equation (1). When the laser beam which is irradiated to the recording surface of the optical disc DSC becomes the defocusing state, the focusing error signal FE indicating the defocusing amount is generated by the arithmetic operation of the equation (2).

The focusing servo circuit 28 generates a focusing servo signal FE' on the basis of the focusing error signal FE generated in the differential amplifier 27 and supplies the focusing servo signal FE' to a focusing actuator (not shown) through the driving circuit 19 in FIG. 9, thereby allowing a position Z of the objective lens 14 in the direction of the optical axis OA to be finely adjusted. The focusing servo, consequently, is automatically performed.

The aberration compensation control circuit 29 generates an aberration compensation control signal SPHE' on the basis of the spherical aberration error signal SPHE generated in the differential amplifier 26 and supplies the aberration compensation control signal SPHE' to an aberration compensation actuator (not shown) through the driving circuit 20 in FIG. 9, thereby allowing a lens interval W of the spherical aberration compensation lens 13 in the direction of the optical axis OA to be finely adjusted. The spherical aberration compensation, consequently, is automatically performed.

The operation of the pickup apparatus PU having the configuration will now be described. The operation for the spherical aberration compensation will be explained.

The control signal SP is supplied to the phase device 12 from the control unit 18 shown in FIG. 9. By adjusting the phase $\delta i$ of the first phase area ARI shown in FIG. 11 to be $\lambda/4$ and adjusting the phase $\delta o$ of the second phase area ARO to be $3\lambda/4$, the phase difference $\Delta$ between the first and second phase areas ARI and ARO is set to $\lambda/2$.

The laser beam H1 of the linear polarization is subsequently emitted from the light source 9. The laser beam H1 is collimated into the parallel light by the collimator lens 10. The collimated beam is transmitted through the polarized beam splitter 11, and is incident on the phase device 12. The laser beam H1, consequently, becomes a circular polarization light when it passes through the first phase area ARI and second phase area ARO of the phase device 12. However, the laser beam passing through the first phase area ARI and that passing through the second phase area ARO become the circular polarization light whose rotating directions are opposite since the phase difference A between the first and second phase areas ARI and ARO has been set to be $\lambda/2$.

The laser beam which became the circular polarization light is transmitted through the spherical aberration compensation lens 13, becomes the laser beam of a small irradiation diameter by the objective lens 14, and is irradiated on the recording surface from the light transmitting layer side of the optical disc DSC. Since the laser beam is further reflected by the recording surface, the resultant 0-th order light RMB(0) becomes a returning light and is incident on the objective lens 14.

Figure 15:
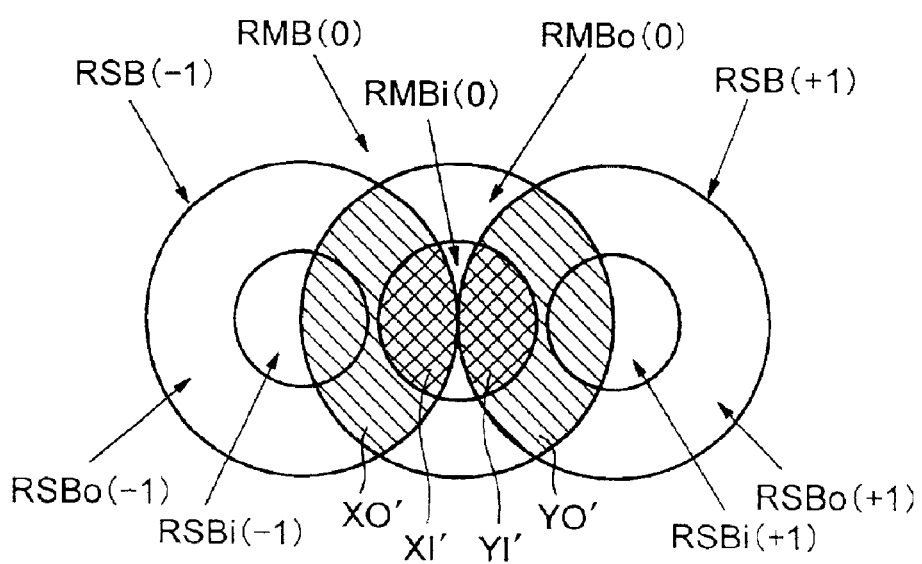
FIG. 15 is a diagram showing a diffraction pattern of a 0-th order light and ±1 primary diffracted lights which were diffracted by the optical disc.

Further, the laser beam is diffracted by the recording surface by the track on the recording surface. Thus, a diffraction pattern as shown in FIG. 15, i.e., a diffraction pattern according to the optical parameters such as numerical aperture NA of the objective lens 14 and the track pitch TP of the optical disc DSC is generated. In the state, the ±1 primary diffracted light RSB(+1) and RSB(−1) are partially overlapped to the 0-th order light RMB(0).

The laser beam which is converged by the objective lens 14 and irradiated to the recording surface of the optical disc DSC is constructed by the light of a small incident angle (light transmitted through the first phase area ARI of the phase device 12), and the light of a large incident angle (light transmitted through the second phase area ARO of the phase device 12). The light of the small incident angle and the light of the large incident angle are incident on the recording surface in a state where the phase difference $\Delta$ is held to be $\lambda/2$.

The polarizing directions of the light (inner radius light) RMBi(0) in the inner radius portion of the 0-th order light RMB(0), a light RSBi(+1) in the inner radius portion of the +1 primary diffracted light RSB(+1), and a light RSBi(−1) in the inner radius portion of the −1 primary diffracted light RSB(−1) which are caused when the laser beam is diffracted by the recording surface are equal. The polarizing directions of the light (outer radius light) RMBo(0) in the outer radius portion of the 0-th order light RMB(0), a light RSBo(+1) in the outer radius portion of the +1 primary diffracted light RSB(+1), and a light RSBo(1) in the outer radius portion of the −1 primary diffracted light RSB(−1) are equal.

The polarizing direction of the light RMBi(0), RSBi(+1), and RSBi(−1) in the inner radius portion and the polarizing direction of the light RMBo(0), RSBo(+1), and RSBo(−1) in the outer radius portion are different by the phase difference $\Delta(=\lambda/2)$. The inner radius light RMBi(0) of the 0-th order light RMB(0) and the light RSBo(+1) in the outer radius portion of the +1 primary diffracted light RSB(+1), therefore, do not interfere in the overlapped portion YI'. The inner radius light RMBi(0) of the 0-th order light RMB(0) and the light RSBo(−1) in the outer radius portion of the −1 primary diffracted light RSB(−1) do not interfere in the overlapped portion XI'. The inner radius light RMBi(0) of the 0-th order light RMB(0), consequently, is incident on the objective lens 14 without being decreased or increased in the light intensity even if the ±1 primary diffracted light RSB(+1) and RSB(−1) are overlapped.

Since the polarizing direction of the light RMBo(0) in the outer radius portion of the 0-th order light RMB(0) and that of the light RSBo(+1) in the outer radius portion of the +1 primary diffracted light RSB(+1) are equal, they interfere in the overlapped portion YO' and the light becomes to include the information such as a tracking error or the like. Further, since the polarizing direction of the light RMBo(0) in the outer radius portion of the 0-th order light RMB(0) and that of the light RSBo(−1) in the outer radius portion of the −1 primary diffracted light RSB(−1) are equal, they interfere in the overlapped portion XO' and the light becomes to include the information such as a tracking error or the like.

The 0-th order light RMB(0) becomes the returning light, passes within the effective optical path range of the objective lens 14, further, passes through the spherical aberration compensation lens 13, and is incident on the phase device 12.

In other words, the returning light is interfered by the inner radius light RMBi(0) which is not interfered by the light RSBo(+1) and RSBo(−1) in the outer radius portions of the ±1 primary diffracted light RSB(+1) and RSB(−1) and by the light RSBo(+1) and RSBo(−1) in the outer radius portions of the ±1 primary diffracted light RSB(+1) and RSB(−1), so that it becomes the light including the outer radius light RMBo(0) which includes the information such as a tracking error or the like, passes through the objective lens 14 and spherical aberration compensation lens 13, and is incident on the phase device 12.

Subsequently, in the returning light, the inner radius light RMBi(0) becomes the linear polarization light when it passes through the first phase area ARI of the phase device 12, and the outer radius light RMBo(0) becomes the linear polarization light when it passes through the second phase area ARO of the phase device 12. The inner radius light RMBi(0) and the outer radius light RMBo(0) which are generated from the first and second phase areas ARI and ARO, consequently, become the linear polarization light in the same polarizing direction and are incident on the polarized beam splitter 11. Since the polarizing direction of the inner radius light RMBi(0) and the outer radius light RMBo(0) which are generated from the first and second phase areas ARI and ARO differs from that of the light which is incident on the polarized beam splitter 11 from the light source 9 through the collimator lens 10 by 90°, the inner radius light RMBi(0) and the outer radius light RMBo(0) are reflected toward the condenser lens 15 by the polarized beam splitter 11 and, further, are converged by the condenser lens 15, and are incident on the hologram device 16.

The first and second diffraction areas GRI and GRO are provided in the hologram device 16 as shown in FIG. 12. Therefore, the inner radius light RMBi(0) is diffracted by the first diffraction area GRI to become the circular light spots PI and PI', and are incident on the detecting areas 22 and 23 of the photodetector 17 as shown in FIGS. 13 and 14. The outer radius light RMBo(0) is diffracted by the second diffraction area GRO to become the ring-shaped light spots PO and PO', and are incident on the detecting areas 24 and 25. The photodetector 17 generates the photoelectric conversion signals Sa, Sb, Sc, Sa', Sb', Sc' Sd, Se, Sf, Sd', Se', and Sf indicating the light intensity of the light spots PI, PI', PO, and PO'.

Subsequently, the differential amplifier 27 executes the arithmetic operation of the equation (2) on the basis of the photoelectric conversion signals Sd, Se, Sf, Sd', Se', and Sf' which are generated in the detecting areas 22 and 23, thereby generating the focusing error signal FE. Further, the differential amplifier 26 executes the arithmetic operation of the equation (1) on the basis of the photoelectric conversion signals Sa, Sb, Sc, Sa', Sb', and Sc' which are generated in the detecting areas 24 and 25, thereby generating the spherical aberration error signal SPHE.

The focusing servo circuit 28 generates the focusing servo signal FE' on the basis of the focusing error signal FE and drives the focusing actuator (not shown) through the driving circuit 19, thereby performing the focusing servo so as to position the objective lens 14 to the focal point in the capture range.

The aberration compensation control circuit 29 generates the spherical aberration compensation control signal SPHE' on the basis of the spherical aberration error signal SPHE and drives the aberration compensation actuator through the driving circuit 20, thereby adjusting the optical characteristics of the spherical aberration compensation lens 13 so as to suppress the influence of the spherical aberration. More specifically, the spherical aberration compensation is performed by finely adjusting the facing interval W of the spherical aberration compensation lens 13.

As mentioned above, according to the pickup apparatus PU and the information recording and/or reproducing apparatus of the embodiment, the phase difference Δ is provided between the light in the inner radius portion and the light in the outer radius portion of the laser beam H1 which is emitted from the light source 9 by employing the phase device 12, and the laser beam is irradiated to the optical disc DSC. As shown in FIG. 15, therefore, the interference between the inner radius light RMBi(0) of the 0-th order light RMB(0) which is caused by the reflection and the light RSBo(+1) and RSBo(−1) in the outer radius portions of the ±1 primary diffracted light RSB(+1) and RSB(−1) can be suppressed.

Figure 1:
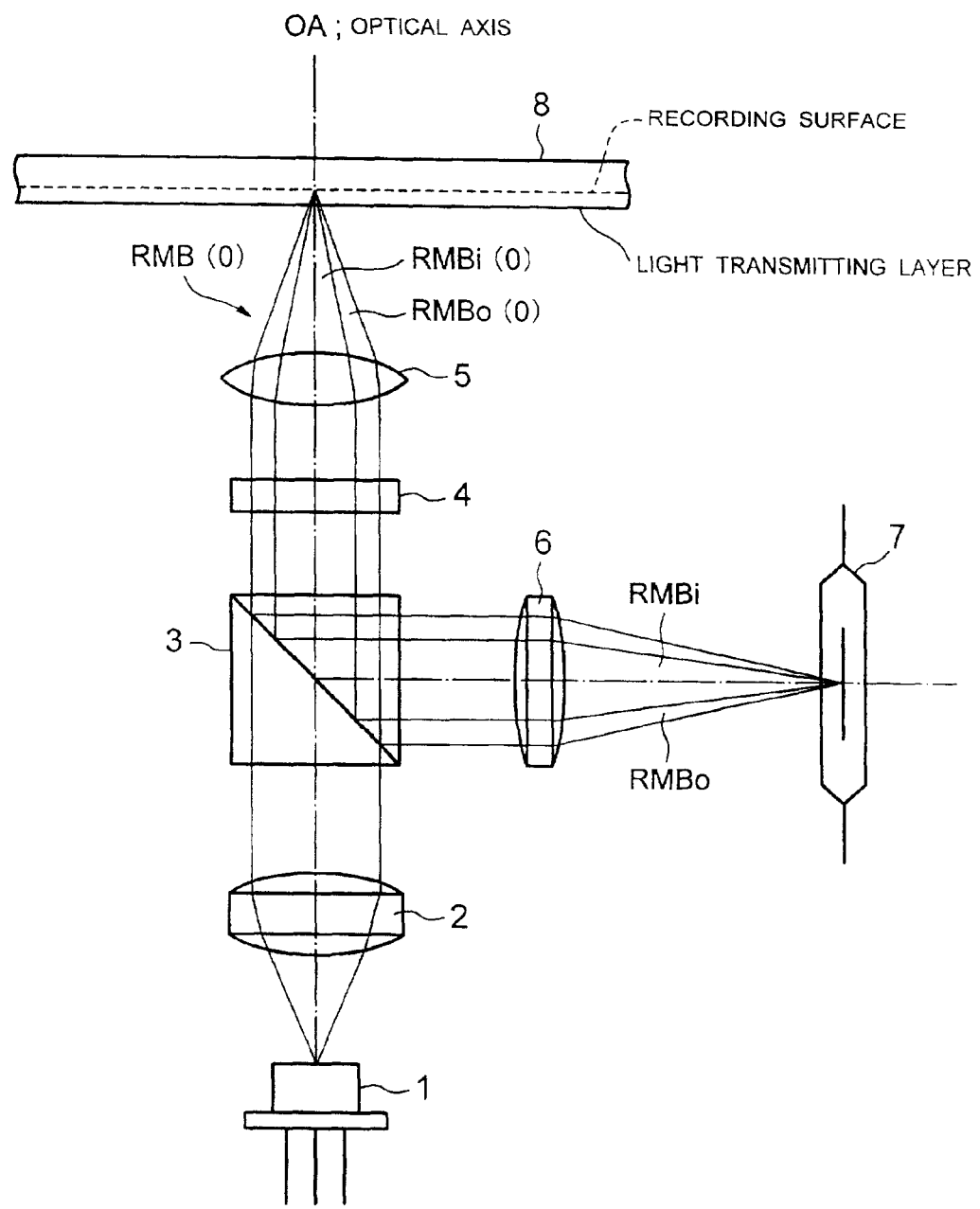
FIG. 1 is a diagram showing a configuration of a conventional optical pickup apparatus.
Figure 2:
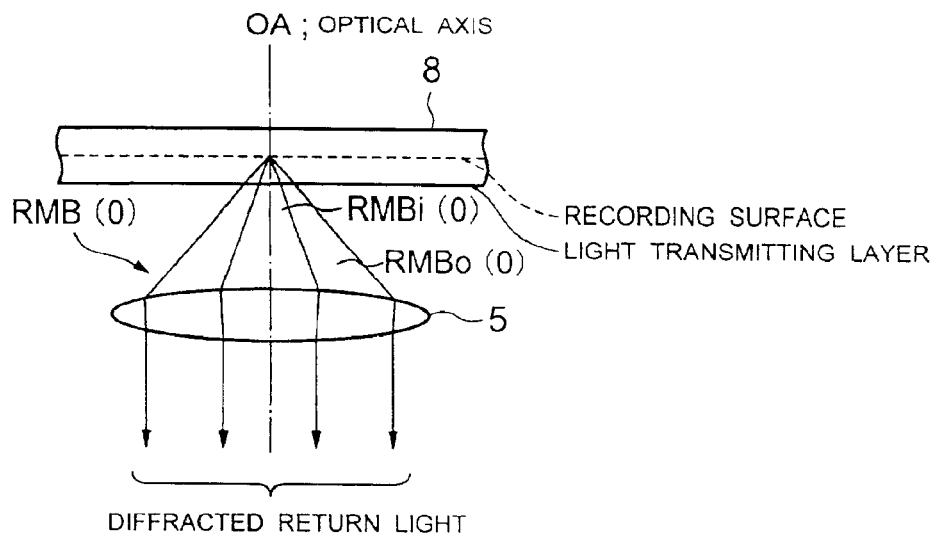
FIG. 2 is a diagram illustrating a state of a returning light occurring on an optical disc in the conventional optical pickup apparatus.
Figure 3:
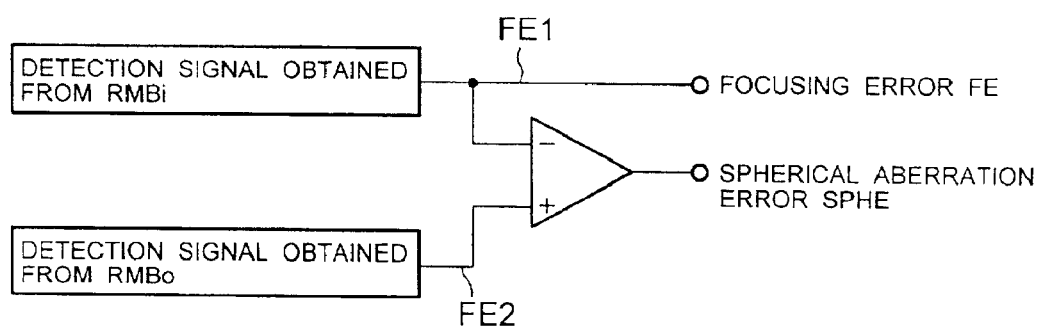
FIG. 3 is a diagram illustrating a principle of a conventional focusing servo and a spherical aberration compensating method.
Figure 6:
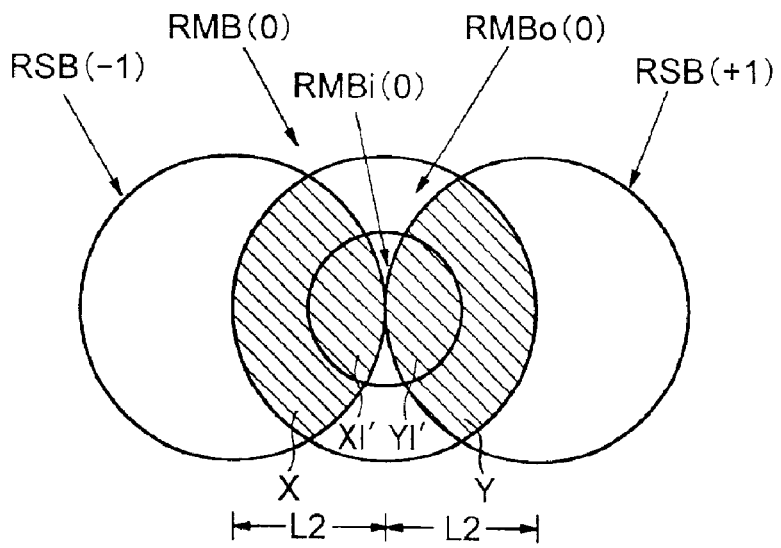
FIG. 6 is a diagram illustrating a diffraction pattern for explaining the problem in the conventional optical pickup apparatus.
Figure 7:
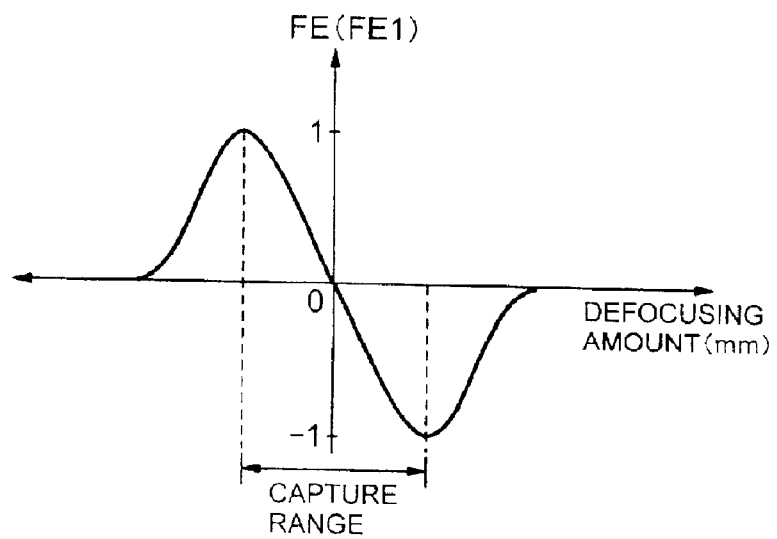
FIG. 7 is a diagram illustrating a waveform of a focusing error signal having a high linearity.
Figure 8:
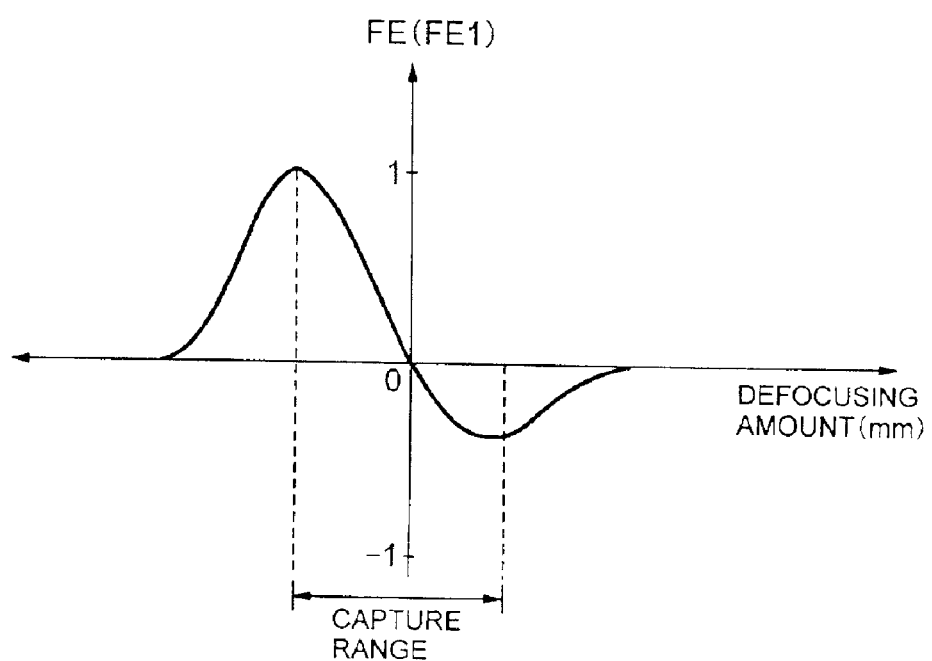
FIG. 8 is a diagram illustrating a waveform of a focusing error signal having a low linearity.

Thus, the inner radius light RMBi(0) and the diffracted light RSBo(+1) and RSBo(−1) in the outer radius portions do not interfere even if the objective lens 14 is in the defocusing state. The problem, therefore, such that the light intensity of the inner radius light RMBi(0) decreases by being adversely influenced by the diffracted light RSBo(+1) and RSBo(−1) can be solved. The focusing error signal FE having the high linearity, consequently, can be obtained by the photodetector 17 and the control unit 18. The focusing servo of high precision can be performed since the focusing error signal FE of high linearity as shown in FIG. 7 is obtained instead of the nonlinear focusing error signal FE as shown in FIG. 8.

Further, even for the different kind of optical disc DSC, the focusing error signal FE of high precision and high linearity can be obtained. The influence of the interference can be suppressed since the phase difference Δ is provided between the light in the inner radius portion and the light in the outer radius portion of the laser beam and the laser beam is irradiated to the optical disc DSC in which the thickness of light transmitting layer, the structure of the recording surface, and the track pitch are different. The focusing error signal FE having a high degree of precision and linearity can be obtained. The pickup apparatus PU and the information recording and/or reproducing apparatus which have excellent compatibility can be, therefore, provided.

Further, the influence of the interference can be suppressed by providing the phase difference Δ between the light in the inner radius portion and the light in the outer radius portion of the laser beam which is irradiated to the optical disc DSC even when the numerical aperture NA of the objective lens 14 is increased, so that the focusing error signal FE having a high degree of precision and linearity can be obtained. The realization of the high NA of the objective lens 14 can be, therefore, promoted. The pickup apparatus and the information recording and/or reproducing apparatus which can perform the high density recording and proper information reproduction corresponding to the high-density optical disc can be provided.

Figure 16:
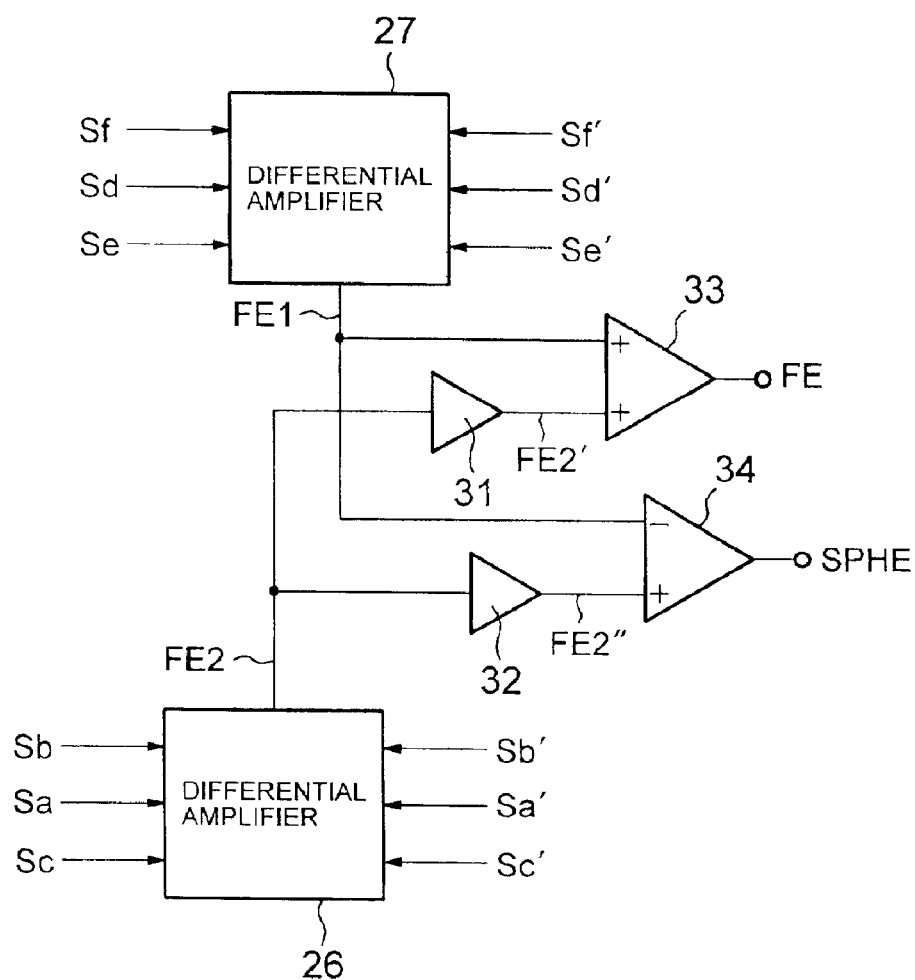
FIG. 16 is a block diagram showing a modification of a circuit for generating a focusing error signal and a spherical aberration error signal.

As a modification of the pickup apparatus PU of the embodiment, the focusing error signal FE and spherical aberration error signal SPHE can be also obtained by the circuit shown in the block diagram of FIG. 16. In the circuit with the configuration, the differential amplifier 27 executes an arithmetic operation of the following equation (3) on the basis of the photoelectric conversion signals Sd, Se, Sf, Sd', Se', and Sf' which are generated in the detecting areas 22 and 23 (refer to FIG. 14) of the photodetector 17, thereby generating a first error signal FE1. The differential amplifier 26 executes an arithmetic operation of the following equation (4) on the basis of the photoelectric conversion signals Sa, Sb, Sc, Sa', Sb', and Sc' which are generated in the detecting areas 24 and 25 of the photodetector 17, thereby generating a second error signal FE2.

$$FE1=\{Sd-(Se+Sf)\}-\{Sd'-(Se'+Sf')\} \quad (3)$$

$$FE2=\{Sa-(Sb+Sc)\}-\{Sa'-(Sb'+Sc')\} \quad (4)$$

The second error signal FE2 is amplified by amplifiers 31 and 32 having predetermined amplification factors. A second error signal FE2' obtained by amplification in the amplifier 31 is added to the first error signal FE1 in an adding circuit 33, thereby generating the focusing error signal FE. By performing a subtraction between a second error signal FE2" obtained by amplification in the amplifier 32 and the first error signal FE1 in a subtractor 34, the spherical aberration error signal SPHE is generated.

Figure 17:
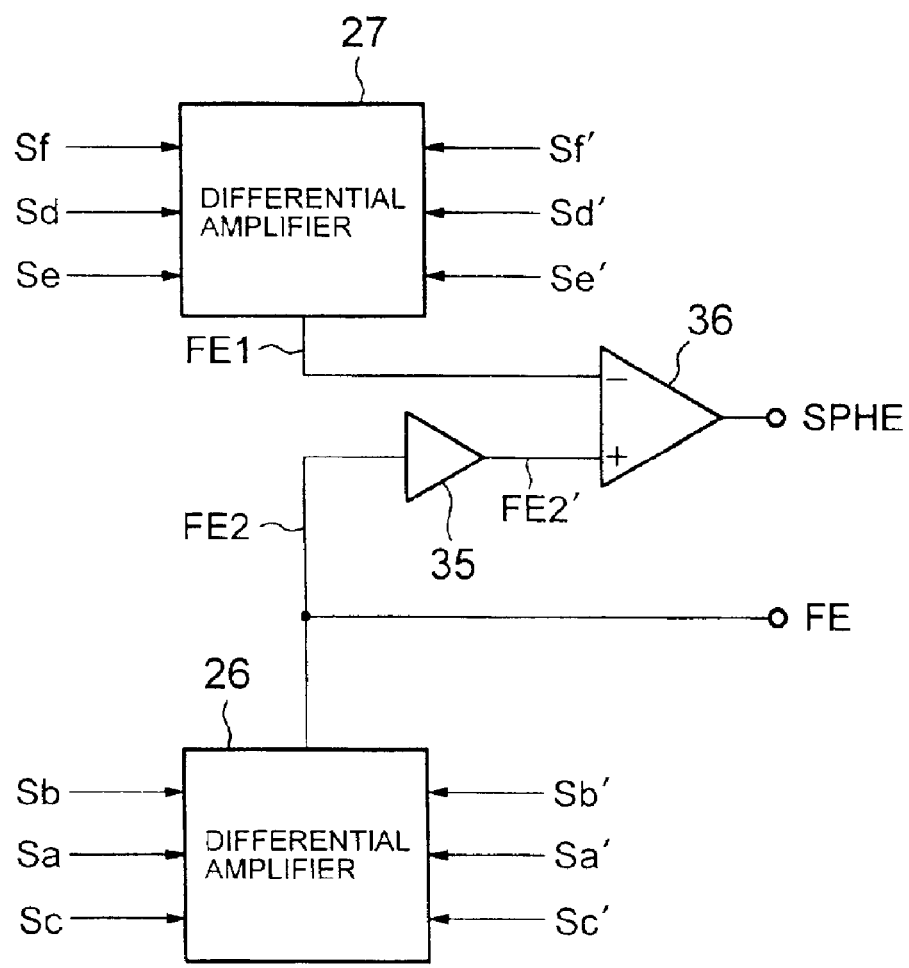
FIG. 17 is a block diagram showing another modification of the circuit for generating the focusing error signal and spherical aberration error signal.

The focusing error signal FE and spherical aberration error signal SPHE can be also obtained by the circuit shown in the block diagram of FIG. 17. In the circuit with the configuration, the differential amplifier 27 executes the arithmetic operation of the equation (3) on the basis of the photoelectric conversion signals Sd, Se, Sf, Sd', Se', and Sf' which are generated in the detecting areas 22 and 23 (refer to FIG. 14) of the photodetector 17, thereby generating the first error signal FE1. The differential amplifier 26 executes the arithmetic operation of the equation (4) on the basis of the photoelectric conversion signals Sa, Sb, Sc, Sa', Sb', and Sc' which are generated in the detecting areas 24 and 25 of the photodetector 17, thereby generating the second error signal FE2.

The second error signal FE2 is amplified by an amplifier 35 having a predetermined amplification factor. A subtraction between the second error signal FE2' obtained in the amplifier 35 and the first error signal FE1 is performed in a subtractor 36, thereby generating the spherical aberration error signal SPHE. The second error signal FE2 is set to the focusing error signal FE.

According to the circuit of FIG. 17, the spherical aberration error signal SPHE of a high degree of precision and linearity can be obtained. As an example of the application, the spherical aberration compensation of high precision can be performed when information recording and information reproduction are executed for the high density DVD or the like having a recording surface of a double layer structure.

Figure 18:
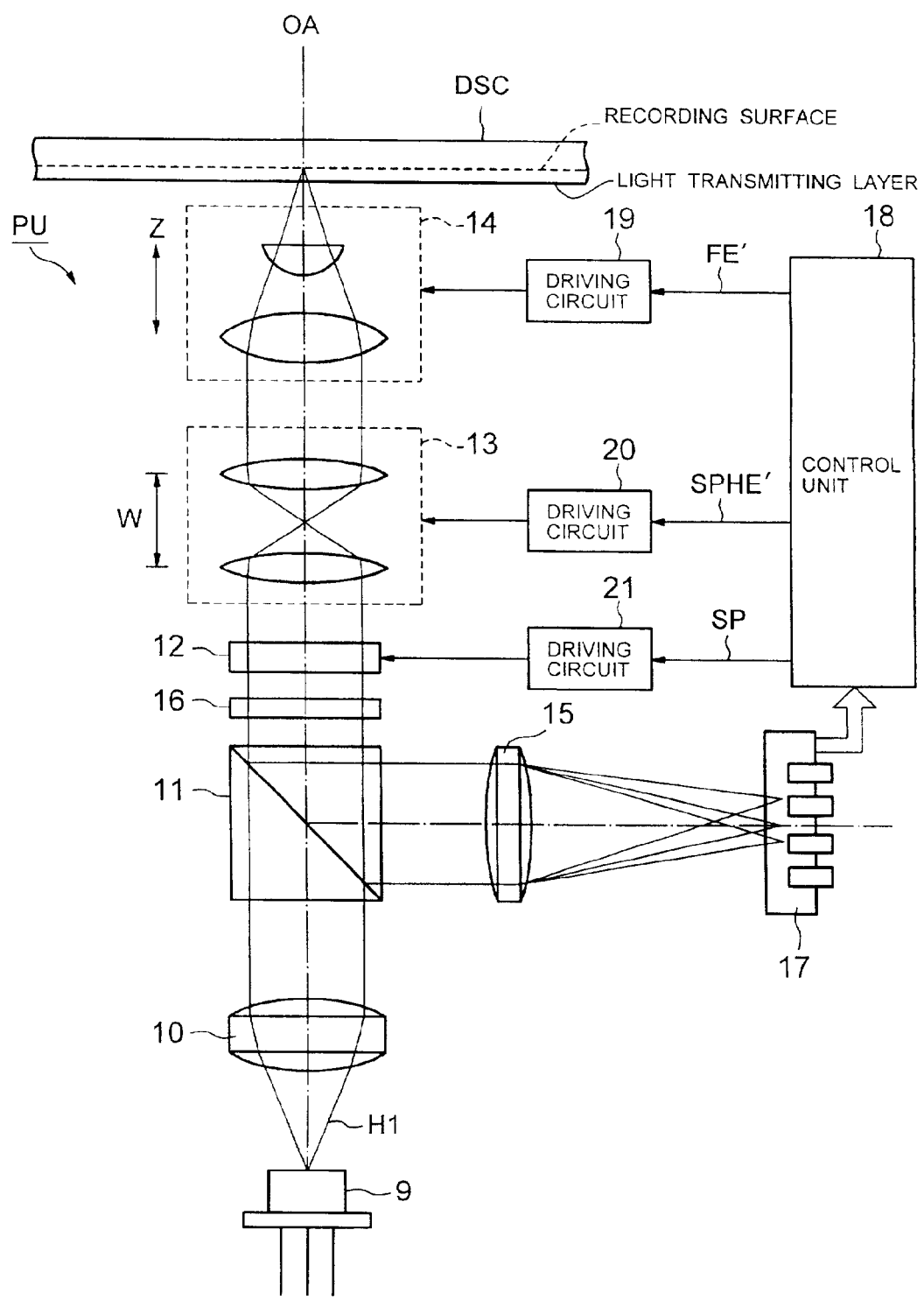
FIG. 18 is a diagram showing the optical pickup apparatus and a configuration of the modification.
Figure 19:
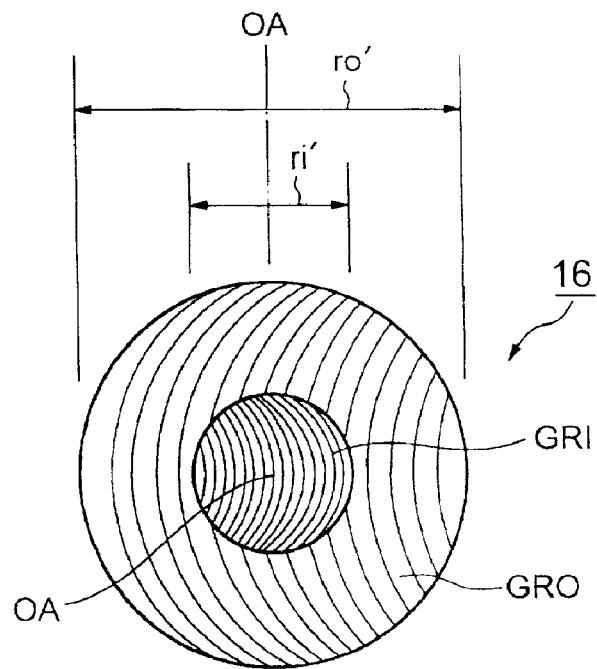
FIG. 19 is a plan view showing a shape of a hologram device which is provided in the optical pickup apparatus in FIG. 18.
Figure 20:
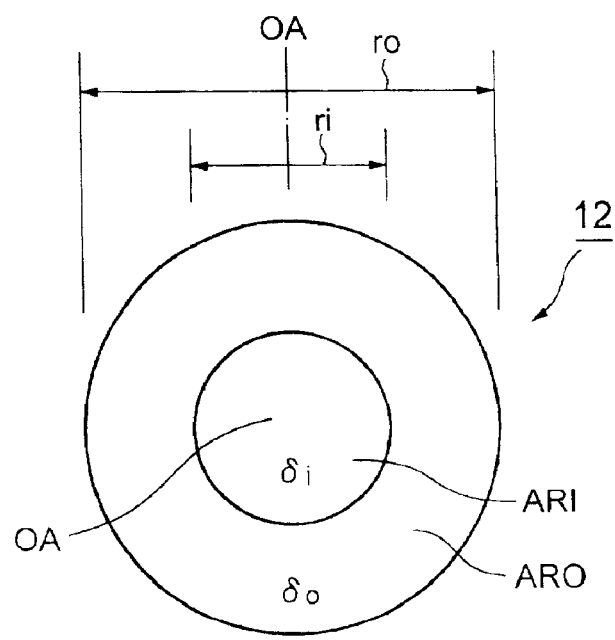
FIG. 20 is a plan view showing a shape of a phase device which is provided in the optical pickup apparatus in FIG. 18.

As a modification of the optical pickup apparatus in the embodiment, a configuration shown in FIG. 18 can be used. The hologram device 16 can be also provided in the optical path between the polarized beam splitter 11 and the phase device 12. In this configuration, however, the diameter ri' of the first diffraction area GRI of the hologram device 16 and the diameter ri of the first phase area ARI of the phase device 12 are equalized as shown in plan views of FIGS. 19 and 20. Further, the diameter ro' of the second diffraction area GRO of the hologram device 16 and the diameter ro of the second phase area ARO of the phase device 12 are equalized.

According to the above-mentioned configuration, the laser beam H1 which is emitted from the light source 9 is collimated to the parallel beam by the collimator lens 10, passes through the polarized beam splitter 11, and incident on the hologram device 16. The light diffracted by the first and second diffraction areas GRI and GRO becomes into the polarizing state having the phase difference Δ in the first and second phase areas ARI and ARO of the phase device 12. The light, then, passes through the spherical aberration compensation lens 13 and objective lens 14, is converted in a beam, and is irradiated to the optical disc DSC.

In a manner similar to the case shown in FIG. 15, therefore, the interference between the 0-th order light RMB(0) which is caused by the diffraction on the recording surface of the optical disc DSC and the ±1 primary diffracted light RSB(+1) and RSB(−1) can be suppressed. The 0-th order light RMB(0) becomes the returning light, passes through the objective lens 14 and spherical aberration compensation lens 13, further becomes the linear polarization light by the phase device 12, is again diffracted by the first and second diffraction areas GRI and GRO of the hologram device 16, and is reflected toward the condenser lens 15 by the polarized beam splitter 11.

The divided light spots PI, PI', PO, and PO' are incident on the detecting areas 22 to 25 of the photodetector 17 in a manner similar to that shown in FIG. 13 since the returning light diffracted by the hologram device 16 is converged by the condenser lens 15. The focusing error signal FE of high precision and high linearity, therefore, can be obtained on the basis of the equation (2). The spherical aberration error signal SPHE can be obtained with high precision by the equation (1).

The focusing error signal FE and spherical aberration error signal SPHE can be also obtained by applying the circuit of FIG. 16 or 17 to the modification shown in FIG. 18.

In the optical pickup apparatuses shown in FIGS. 9 and 18, the positions of the phase device 12 and the spherical aberration compensation lens 13 can be also exchanged. It is also possible to arrange the phase device 12 on the objective lens 14 side and arrange the spherical aberration compensation lens 13 on the polarized beam splitter 11 side. In other words, the phase device 12 can be arranged at a proper position so as to make the polarizing directions are different of the light in the inner radius portion and the light in the outer radius portion of the laser beam which is irradiated from the objective lens 14 to the optical disc DSC.

In the optical pickup apparatuses shown in FIGS. 9 and 18, the polarized beam splitter 11 is arranged between the objective lens 14 and the spherical aberration compensation lens 13 and the returning light can be reflected toward the photodetector 17 side by the polarized beam splitter 11. In other words, the polarized beam splitter 11 can be arranged at a proper position so long as it is a position where the returning light which is reflected by the optical disc DSC and passing through the objective lens 14, and the laser beam which is emitted from the light source are separated and the returning light is supplied to the photodetector side. The polarized beam splitter 11 can be arranged between the objective lens 14 and the spherical aberration compensation lens 13 and the positions of the phase device 12 and the spherical aberration compensation lens 13 can be also exchanged as mentioned above.

Although the embodiment has been described above with respect to the case where the phase device 12 which can variably adjust the phase characteristics of the first phase area ARI and the second phase area ARO is provided, it is also possible to use a phase device in which the phase characteristics of the first phase area ARI and the second phase area ARO are fixed.

Although the embodiment has been described above with respect to the case where the phase difference Δ of the first phase area ARI from the second phase area ARO of the phase device 12 is set to λ/2, the invention is not limited to the phase difference. Even if the phase difference Δ between the first phase area ARI and the second phase area ARO is adjusted in a range of about ±λ/12 around the phase difference λ/2 as a center, the focusing error signal FE and the spherical aberration error signal SPHE which are sufficiently appropriate or practical can be obtained.

Although only the operation for obtaining the spherical aberration error signal SPHE and the focusing error signal FE has been described in the embodiment described above, the spherical aberration error signal SPHE and the focusing error signal FE can be simultaneously obtained at the time of information recording and information reproduction.

The phase difference Δ between the first phase area ARI and the second phase area ARO of the phase device 12 is set to λ/2 when the spherical aberration error signal SPHE and the focusing error signal FE are obtained, while the phase difference Δ between the first phase area ARI and the second phase area ARO can be set to 0 when information recording and information reproduction are performed. The phase difference Δ between the first phase area ARI and the second phase area ARO of the phase device 12 is set to λ/2 when the spherical aberration compensation is performed and when information recording is performed while the phase difference Δ between the first phase area ARI and the second phase area ARO is set to 0 when information reproduction is performed, and the like. In this manner, various modifications are possible.

Although the case where each of the detecting areas 22 to 25 of the photodetector 17 is constructed by three divided detecting portions has been described, it is not limited to the number of division. Each detecting area can be also constructed by a plurality of two-dimensionally divided detecting portions instead of arranging the detecting portions in the same direction.

According to the optical pickup apparatus of the present invention as described above, the phase device is provided in the optical path between the light source and the objective lens. The phase device provides the phase difference between the inner radius portion and the outer radius portion of the light beam emitted from the light source. The laser beam which is provided with the phase difference is irradiated on the information recording medium. The returning light from the information recording medium, therefore, can be converted to the light in which the influence by the interference based on the ±1 primary diffracted light which is caused by diffraction by the information recording medium has been suppressed. The focusing error and the spherical aberration error of high linearity can be, therefore, detected with high precision on the basis of the returning light. It is, consequently, possible to provide a pickup apparatus which is adapted to application of the high NA objective lens and to the high-density information recording medium, and has an excellent compatibility against different kinds of information recording media.

According to the information recording and/or reproducing apparatus of the present invention, by providing the pickup apparatus, it is possible to provide an information recording and/or reproducing apparatus which is adapted to the high-density information recording medium, and has an excellent compatibility against different kinds of information recording media.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

What is claimed is:

1. An optical pickup apparatus comprising:
a light source which emits a light beam which is linearly-polarized;
a collimator lens which collimates the light beam emitted from said light source into a parallel light beam;
a phase device which changes the polarization of an inner light and the polarization of an outer light so that the inner light and the outer light are circularly polarized and the rotating direction of the inner light polarization is opposite to the rotating direction of the outer light polarization, the inner and outer lights being inner and outer radius portions of said parallel light beam, respectively;
an objective lens which converges the light beam passed through said phase device so that a converge light beam is incident on an information recording medium; and
a detector which detects the respective intensities of reflected lights of the inner and the outer lights from said information recording medium to generate error information with regard to said information recording medium.

2. An apparatus according to claim 1, wherein said phase device comprises an inner phase area and an outer phase area which possess phase characteristics such that the reflected lights of the inner and the outer lights from said information recording medium do not interfere with each other.

3. An apparatus according to claim 1, wherein said phase device is a variable phase device in which the polarization of an inner light and the polarization of an outer light is varied.

4. An apparatus according to claim 1, wherein said phase device includes a liquid crystal device having electrodes provided thereon corresponding to the inner light and the outer light of said parallel light beam, said liquid crystal device changing the polarization of the inner light and the outer light in accordance with voltages applied to said electrodes.

5. An apparatus according to claim 1, further comprising an optical device which is provided at an arbitrary position in an optical path between said light source and said objective lens, said optical device separating the light emitted from said light source and the reflected light from said information recording medium and supplying said reflected light to said detector.

6. An apparatus according to claim 1, further comprising a driver for positioning said objective lens on a focal point on the basis of said error information detected by said detector.

7. An apparatus according to claim 1, further comprising a spherical aberration compensation device which is provided at an arbitrary position in an optical path between said light source and said objective lens and compensates a spherical aberration of the light emitted from said light source on the basis of said error information detected by said detector so as to suppress an influence of the spherical aberration on the light beam that is caused by a thickness error of said information recording medium.

8. An information recording and/or reproducing apparatus having an optical pickup apparatus according to claim 1, wherein information recording or information reproduction is performed by irradiating the light beam on said information recording medium.

* * * * *